United States Patent [19]

Mitomo et al.

[11] 4,438,051
[45] Mar. 20, 1984

[54] PROCESS FOR PRODUCING A TRANSLUCENT β-SIALON SINTERED PRODUCT

[75] Inventors: Mamoru Mitomo; Yusuke Moriyoshi; Toshikazu Sakai; Toshiaki Osaka, all of Sakura, Japan

[73] Assignee: National Institute for Researches in Inorganic Materials, Ibaraki, Japan

[21] Appl. No.: 387,779

[22] Filed: Jun. 14, 1982

[30] Foreign Application Priority Data

Jul. 6, 1981 [JP] Japan ................. 56-105301

[51] Int. Cl.³ .................. C04B 35/58; C04B 35/64
[52] U.S. Cl. ........................ 264/1.2; 264/65; 264/332; 501/98; 501/904
[58] Field of Search ............. 264/1.2, 65, 332; 501/97, 98, 904; 423/327

[56] References Cited

U.S. PATENT DOCUMENTS

| | | | |
|---|---|---|---|
| 3,903,230 | 9/1975 | Kamigaito et al. | 264/322 |
| 3,991,148 | 11/1976 | Lumby et al. | 264/65 |
| 4,113,503 | 9/1978 | Lumby et al. | 264/65 |
| 4,146,379 | 3/1979 | Copley et al. | 501/904 |
| 4,241,000 | 12/1980 | McCauley et al. | 264/65 |
| 4,310,499 | 1/1982 | Mitomo et al. | 264/65 |

OTHER PUBLICATIONS

Mitomo, M. et al.–"Translucent β-Sialon Ceramics"(1982), J. of Materials Science Letters, pp. 25–26.
Mitomo, M. et al.–"Microstructure of Translucent β-Sialon Ceramics", *Ceramic Powders*–Ed. by P. Vincenzi (1983), Pub. by Elsener Sci. Pub. Co., Amsterdam, The Netherlands, pp. 911–920.
Mitomo, M. et al. "Fabrication of High Strength β-Sialon by Reaction Sintering"–J. Materials Science 14 (1979), pp. 2309–2316.

*Primary Examiner*—Helen M. McCarthy
*Attorney, Agent, or Firm*—Oblon, Fisher, Spivak, McClelland & Maier

[57] ABSTRACT

A process for producing a translucent β-sialon sintered product, which comprises mixing fine powders of silicon nitride and aluminum nitride having a high purity of at least 99% and a particle size of at most 200 microns and fine powders of aluminum oxide and silicon oxide having a high purity of at least 99% in such a proportion as to form β-sialon of the formula $Si_{6-z}Al_zO_zN_{8-z}$ where z is from 1 to 4.2, and hot-pressing the mixture in a nitrogen atmosphere at a temperature of from 1500° to 1850° C. under pressure of from 10 to 1500 kg/cm².

6 Claims, 1 Drawing Figure

PROCESS FOR PRODUCING A TRANSLUCENT β-SIALON SINTERED PRODUCT

BACKGROUND OF THE INVENTION

1. Field of the Invention

The present invention relates to a process for producing a translucent β-SIALON sintered product.

2. Description of the Prior Art

β-SIALON is composed of β-type silicon nitride ($Si_3N_4$) partly substituted at its Si-position and N-position by solid solution components of Al and O, respectively. Like a silicon nitride sintered product, the β-SIALON sintered product has superior high temperature strength and thermal shock resistance and a small thermal expansion coefficient. Further, it exhibits not only oxidation resistance at a high temperature but also superior corrosion resistance against slags and molten metals. Thus, it is expected to be a superior new high temperature material.

Heretofore, the β-SIALON sintered product has been produced by heating a mixture composed of a predetermined molar ratio of $Si_3N_4$—$Al_2O_3$—$AlN$ or $Si_3N_4$—$SiO_2$—$AlN$ at a high temperature by hot-pressing or by sintering. However, the sintered product thereby obtained does not have a translucency. There has been no attempt to make it translucent. If a translucent property is imparted in addition to the above-mentioned superior high temperature characteristics, the sintered product will be useful for application to an emission tube for a high pressure sodium lamp and as a high temperature window material or a window material for an infrared ray detector or as a substrate for IC.

SUMMARY OF THE INVENTION

It is an object of the present invention to provide a process for producing a translucent β-SIALON product.

The present inventors have conducted extensive researches to attain the above object, and as a result, have found that a translucent sintered product can be obtained by hot-pressing highly pure powdery starting materials under certain specific conditions. On the basis of this discovery, the present invention has been accomplished.

Namely, the present invention provides a process for producing a translucent β-SIALON sintered product, which comprises mixing fine powders of silicon nitride and aluminum nitride having a high purity of at least 99% and a particle size of at most 200 microns and fine powders of aluminum oxide and silicon oxide having a high purity of at least 99% in such a proportion as to form β-SIALON of the formula $Si_{6-z}Al_zO_zN_{8-z}$ where z is from 1 to 4.2, and hot-pressing the mixture in a nitrogen atmosphere at a temperature of from 1500° to 1850° C. under pressure of from 10 to 1500 kg/cm².

DETAILED DESCRIPTION OF THE PREFERRED EMBODIMENTS

Figure 1:
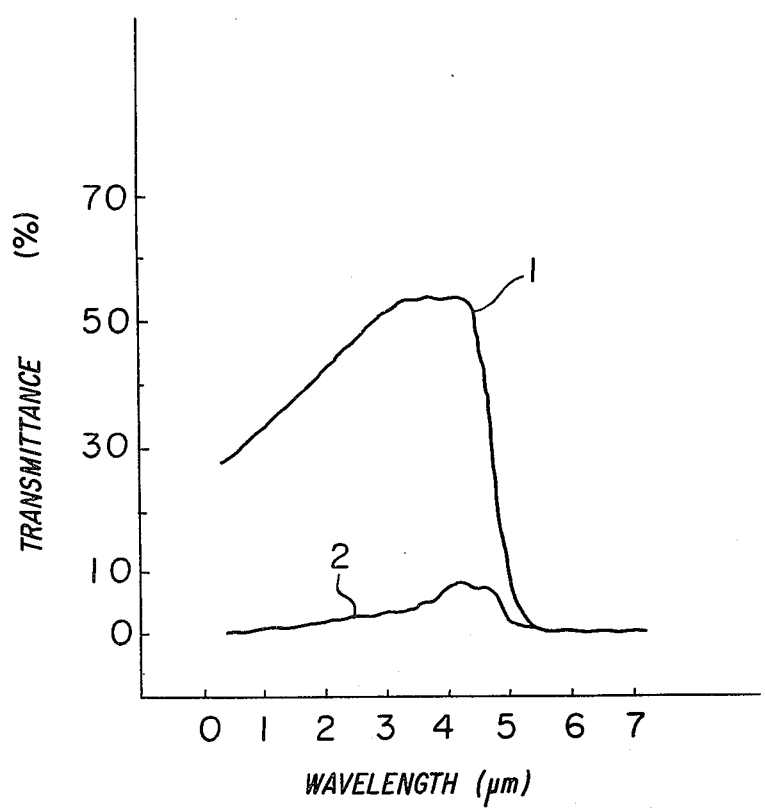
FIG. 1 is a graph illustrating the relation between the transmittance of the sintered product and the wavelength.

In the present invention, fine powders of $Si_3N_4$ and AlN having a high purity of at least 99% and a particle size of at most 200 microns, preferably at most 100 microns and fine powders of $Al_2O_3$ and $SiO_2$ having a particle size of at most 100 microns, are used to obtain a mixture of $Si_3N_4$—$Al_2O_3$—$AlN$, $Si_3N_4$—$SiO_2$—$AlN$ or $Si_3N_4$—$Al_2O_3$—$SiO_2$—$AlN$ by mixing them in such a proportion to form β-SIALON by a reaction represented by the formula

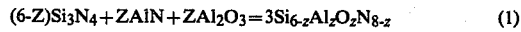

$$(6-Z)Si_3N_4 + ZAlN + ZAl_2O_3 = 3Si_{6-z}Al_zO_zN_{8-z} \quad (1)$$

or

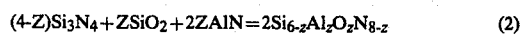

$$(4-Z)Si_3N_4 + ZSiO_2 + 2ZAlN = 2Si_{6-z}Al_zO_zN_{8-z} \quad (2)$$

where z is from 1 to 4.2, or by a mixed reaction thereof. Namely, the process of the present invention comprises mixing the above starting materials in such a proportion as to form a β-SIALON represented by the general formula $Si_{6-z}Al_zO_zN_{8-z}$ where z is from 1.0 to 4.2, and heating and sintering the mixture in a nitrogen gas stream at a temperature of from 1500° to 1850° C. under pressure of from 10 to 1500 kg/cm².

Metal impurities in the powdery starting materials must be at most 1 wt.%, preferably at most 0.5 wt.%. Among the metal impurities, Si, Al, Be, Ga and Ge are soluble in the β-SIALON to form a solid solution and accordingly they do not substantially affect the translucency of the β-SIALON. However, there is a close relationship between the translucency and the amount of other metal impurities. If the amount of such impurities exceeds 1 wt.%, the sintered product thereby obtained tends to be gray to black and will not exhibit the translucency. Thus, in the present invention, the high purity of at least 99% is meant for the amount of metals other than said metals, which is at most 1 wt.%.

Among the powdery starting materials if silicon nitride or aluminum nitride particles having a particle size greater than 200 microns are contained in the fine powders, they tend to remain as unreacted substances in the sintered product and scatter a light, whereby the transmittance will be degraded. Therefore, it is necessary to avoid an inclusion of such large particles.

For the hot-pressing, it is preferred to use a graphite mold coated with boron nitride to prevent a reaction with the starting materials or the sintered product. The hot-pressing is carried out at a temperature of from 1500° to 1850° C., preferably from 1650° to 1750° C. under pressure of from 10 to 1500 kg/cm², preferably from 100 to 500 kg/cm². If the temperature is lower than 1500° C., the reaction does not proceed adequately and the density tends to be inadequate, and a translucent sintered product is hardly obtainable. If the temperature exceeds 1850° C., silicon nitride as the starting material and the β-SIALON formed are likely to undergo thermal decomposition, whereby the density will be inadequate and a translucent sintered product is hardly obtainable.

If the pressure at the time of the sintering is less than 10 kg/cm², no adequate effect of the pressing is obtainable and the sintered product thereby obtained will not exhibit translucency. Even when the pressure exceeds 1500 kg/cm², a translucent sintered product is obtainable. However, such a high pressure is industrially disadvantageous since it is thereby required to use a high strength material for the graphite mold, thus leading to costly operation.

The sintering time is from 15 minutes to 20 hours, preferably from 1 to 5 hours. If the time is shorter than 15 minutes, the reaction will be inadequate, and the sintered product tends to be non-uniform. On the other hand, if the time exceeds 20 hours, the sintered product undergoes thermal decomposition. The sintering time is dependent on the sintering temperature and pressure. In general, a translucent sintered product is obtainable in a short period of time when the temperature and pressure are high.

The formation and sintering of the β-SIALON occurs via intermediary phase termed the X-phase having a high oxygen content. The X-phase melts at the sintering temperature, and silicon nitride and aluminum nitride will be dissolved in the melt and reacted with the molten material to form precipitates of β-SIALON. A sintered product having a high density is obtainable by the solution-precipitation process coupled with the sintering which proceeds simultaneously. This sintering is conducted in a nitrogen gas stream or in an inert atmosphere containing nitrogen. Nitrogen serves to prevent thermal decomposition of silicon nitride as the starting material and the formed β-SIALON.

In order to obtain a translucent sintered product, the composition of the mixture of the starting materials must be such that z in the reaction formulas (1) and (2) is from 1.0 to 4.2. If the starting materials having a composition where z is less than 1.0, are used, the sintering does not adequately proceed and pores of at least 2% will remain in the product and a translucent sintered product will not be obtained. The upper limit of z being 4.2 represents the solubility limit, and if z exceeds the limit, unreacted substances will precipitate at the grain boundaries, whereby a translucent sintered product will not be obtained.

According to the present invention, it is possible to produce a translucent sintered product of β-SIALON which has not been obtainable by conventional processes, and which has superior properties suitable for use as an emission tube for a high pressure sodium lamp, a high temperature window material, a window material for an infrared ray detector or a substrate for IC.

Now, the invention will be described in further detail with reference to Examples.

EXAMPLE 1

Powdery starting materials of silicon nitride (metal impurities: not more than 0.2%; particles size: not more than 2 microns), aluminum nitride (metal impurities: not more than 0.1%; particle size: not more than 20 microns) and aluminum oxide (metal impurities: not more than 0.1%; particle size: not more than 1 micron) were mixed in a molar ratio of 1:2:2. About 1.5 g of the mixture was weighed and hot-pressed in a graphite mold coated with boron nitride powder at 1700° C. under pressure of 150 kg/cm² for 3 hours. The sintered product was β-SIALON where z was 4 and had a porosity of 0.3%. The sintered product having a thickness of 0.6 mm had a translucent property, and the relation between the transmittance and the wavelength was as shown in FIG. 1. It has been found that the sintered product exhibits a higher transmittance at a wavelength of from 3 to 5 microns i.e. at a near infrared region than at a wavelength of less than 1 micron i.e. the visible region. In FIG. 1, the curve identified by reference numeral 1 indicates the one obtained by this Example and the curve 2 indicates the one obtained by Comparative Example 1.

EXAMPLES 2 to 4

Sintered products were prepared in the same manner as in Example 1 except that the powdery starting materials, their compositions and the conditions were as shown in Table 1. The results thereby obtained are shown in Table 1. The same starting materials as used in Example 1 were used except for the ones identified in the Notes in Table 1.

COMPARATIVE EXAMPLES 1 TO 4

When starting materials having a low purity or containing coarse particles were used or when mixtures having a composition where z was 0.5 were hot-pressed, no translucent sintered products were obtained as shown in Table 1. The transmittance of the sintered product obtained in Comparative Example 1 was as shown by the curve 2 in FIG. 1. It is seen that the transmittance is extremely low.

TABLE 1

| Examples | Example 2 | Example 3 | Example 4 | Comparative Exp. 1 | Comparative Exp. 2 | Comparative Exp. 3 | Comparative Exp. 4 |
|---|---|---|---|---|---|---|---|
| Starting material | $Si_3N_4$—$Al_2O_3$—AlN | $Si_3N_4$—$SiO_2$—AlN | $Si_3N_4$—$Al_2O_3$—AlN | $Si_3N_4$—$Al_2O_3$—AlN | $Si_3N_4$—$SiO_2$—AlN | $Si_3N_4$—$Al_2O_3$—AlN | $Si_3N_4$—$Al_2O_3$—AlN |
| Compositions (Value Z) | 2 | 3 | 4 | 4 | 2 | 0.5 | 3 |
| Sintering conditions: | | | | | | | |
| Temp. (°C.) | 1700 | 1750 | 1650 | 1700 | 1750 | 1700 | 1700 |
| Pressure (kg/cm²) | 200 | 100 | 500 | 200 | 150 | 300 | 200 |
| Time (hr.) | 2 | 1 | 1.5 | 2 | 1 | 2 | 2 |
| Porosites of sintered products (%) | 0.1 | 0.3 | 0.1 | 0.1 | 0.4 | 2.3 | 0.1 |
| Translucency | yes | yes | yes | no | no | no | no |
| Notes | AlN having a particle size of at most 74 microns | $SiO_2$ having a purity of 99.9% and a particle size of at most 30 microns | $Si_3N_4$ having a particle size of at most 20 microns | AlN containing particles having a size greater than 200 microns | AlN having a purity of 96.3% $Si_3N_4$ having a purity of 98.5% | | $Si_3N_4$ having a purity of 98.5% |

We claim:

1. A process for producing a translucent β-SIALON sintered product, which comprises mixing fine powders of silicon nitride and aluminum nitride having a high purity of at least 99% and a particle size of at most 200 microns and fine powders of aluminum oxide and silicon oxide having a high purity of at least 99% in such a proportion as to form β-SIALON of the formula $Si_{6-z}Al_zO_zN_{8-z}$ where z is from 1 to 4.2, and hot-pressing the mixture in a nitrogen atmosphere at a temperature of from 1500° to 1850° C. under pressure of from 10 to 1500 kg/cm².

2. The process according to claim 1 wherein fine powders of Si₃N₄ and AlN have a particle size of at most 100 microns.

3. The process according to claim 1 wherein the hot-pressing is conducted in a graphite mold coated with boron nitride.

4. The process according to claim 1 wherein the hot-pressing is carried out at a temperature of from 1650° to 1750° C. under pressure of from 100 to 500 kg.

5. The process according to claim 1 wherein the hot-pressing time is from 15 minutes to 20 hours.

6. The process according to claim 1 wherein the hot-pressing time is from 1 to 5 hours.

* * * * *